United States Patent Office 3,507,925
Patented Apr. 21, 1970

3,507,925
NEW 4,5,6,6 - TETRAHALOTETRACYCLO
[5,3,0,0$^{2,10}$,0$^{3,8}$]DEC - 5 - ENES AND METHOD OF PRODUCTION
Stephen W. Tobey, Sudbury, Mass., and David C. F. Law, Midland, Mich., assignors to The Dow Chemical Company, Midland, Mich., a corporation of Delaware
No Drawing. Filed Mar. 7, 1968, Ser. No. 711,186
Int. Cl. C07c 23/20
U.S. Cl. 260—648                      4 Claims

ABSTRACT OF THE DISCLOSURE

New 4,4,5,6 - tetrahalotetracyclo[5,3,0,0$^{2,10}$,0$^{3,8}$]dec-5-enes, useful as bactericides and fungicides, and a new method for producing these compounds which comprises reacting a tetrahalocyclopropene with bicyclo[2,2,1]hepta-2,5-diene at a temperature of from 50° to 120° C.

SUMMARY OF THE INVENTION

The present invention is directed to a new class of 4,4,5,6 - tetrahalotetracyclo[5,3,0,0$^{2,10}$,0$^{3,8}$]dec-5-enes and to a method of preparing these compounds.

The new 4,4,5,6-tetrahalotetracyclo[5,3,0,0$^{2,10}$,0$^{3,8}$]dec-5-enes of the present invention correspond to the formula

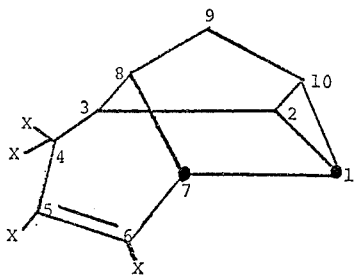

In the present specification and claims, X represents a halogen such as chlorine or bromine.

The new compounds of the present invention are crystalline solids and are soluble in common organic solvents such as ether, carbon tetrachloride and the like. The new 4,4,5,6-tetrahalotetracyclo[5,3,0,0$^{2,10}$,0$^{3,8}$]dec-5-enes of the present invention are useful as bactericides and fungicides for the kill and control of various bacterial and fungal organisms such as *Staphylococcus aureus, Candida albicans, Salmonella typhosa, Candida pelliculosa, Aspergillus terreus, Trichophyton mentagrophytes* (the causative organism of athlete's foot) and *Bacillus subtilis*.

In accordance with the new process of the present invention, the new compounds are produced by reacting a bicyclo[2,2,1]hepta-2,5-diene with a tetrahalocyclopropene corresponding to the formula

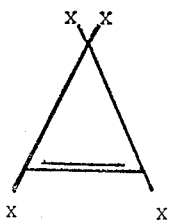

The process of the present invention proceeds readily when carried out in an excess of either reactant as reaction medium. However, in a convenient procedure, the tetrahalocyclopropene and the bicyclo[2,2,1]hepta-2,5-diene are dispersed in an inert organic solvent as reaction medium. Representative inert organic solvents include various aliphatic and aromatic hydrocarbons and ether solvents such as carbon tetrachloride, chloroform, hexane, benzene, toluene, diethyl ether, petroleum ethers, tetrahydrofuran and the like. The reaction mixture thus obtained is maintained at a temperature within the desired temperature range for a period of time. In order to obtain optimum yields of the desired product, it is essential that the reaction mixture be substantially free from water. The presence of water in a reaction mixture in an amount greater than one mole percent causes various side reactions with the production of undesirable by-products and the attendant reduction in the amount of desired product produced.

The reaction proceeds smoothly with the production of good yields of the desired 4,4,5,6-tetrahalotetracyclo[5,3,0,0$^{2,10}$,0$^{3,8}$]dec-5-ene products at temperatures within the reaction temperature range of from about 50° to about 120° C. and preferably at temperatures within the range of from 80° to 100° C. Carrying out the reaction at temperatures substantially in excess of 120° C. results in a decrease in desired product due to undesirable side reactions. The temperature of the reaction mixture is maintained within the reaction temperature range for a period of from several hours to several days; with the longer reaction time being employed at the lower temperatures. The reaction can be carried out under atmospheric pressure or under superatmospheric pressure. It is often convenient to carry out the reaction in a sealed reaction vessel under autogenous pressure. The use of superatmospheric pressures is particularly desirable when the boiling point of the solvent being employed or one of the reactants is below the reaction temperature.

Good yields of the desired product are obtained when the reactants are employed in proportions ranging from substantially equimolar proportions to a 5-fold excess of either the tetrahalocyclopropene or the bicyclo[2,2,1]hepta-2,5-diene with respect to the other reactant. A greater than 5-fold excess of either reactant can be employed without materially decreasing the yield of the desired product; however, such large excesses are uneconomical and, therefore, undesirable.

In carrying out the process of the present invention, the tetrahalocyclopropene such as tetrachlorocyclopropene or tetrabromocyclopropene and the bicyclo[2,2,1]hepta-2,5-diene are admixed and the temperature of the resulting reaction mixture maintained within the desired temperature range for a period of time. Following the reaction period, the product is separated from the reaction mixture by conventional isolation procedures. In a convenient procedure, the reaction mixture is distilled under reduced pressure to remove the low boiling constituents and obtain the desired product as a residue. This product residue is then employed as a bactericidal or fungicidal agent or further purified by such conventional procedures as washing, recrystallization, or distillation before being so employed.

SPECIFIC EMBODIMENTS

The following examples of the present invention are merely illustrative and are not deemed to be limiting.

Example 1

Tetrachlorocyclopropene (1.5 grams, 8.4 mmoles), bicyclo[2,2,1]hepta-2,5-diene (0.8 gram, 8.7 mmoles) and 2 milliliters of carbon tetrachloride were added to a reaction tube which was thereafter sealed and heated at 100° C. for three days. Following the reaction period, the reaction mixture was distilled under reduced pressure to remove the low boiling constituents to obtain a solid residue. The solid residue was recrystallized from petroleum ether to obtain the crystalline solid 4,4,5,6-tetrachlorotetracyclo[5,3,0,0$^{2,10}$,0$^{3,8}$]dec-5-ene product melting at 62–63° C. The product was obtained in a yield of 79 percent of theoretical based upon tetrachloropropene.

Example 2

Tetrabromocyclopropene (0.71 gram, 2 mmoles) and bicyclo[2,2,1]hepta-2,5-diene (0.8 gram, 8.7 mmoles) are dispersed in 2 milliliters of tetrahydrofuran. The resulting reaction mixture is maintained at a temperature of 60° C. for 10 days. Following the reaction period, the reaction mixture is distilled at reduced pressure to obtain a solid residue which is thereafter recrystallized from carbon tetrachloride to obtain the crystalline solid 4,4,5,6-tetrabromotetracyclo[5,3,0,0$^{2,10}$,0$^{3,8}$]dec - 5 - ene (molecular weight of 447.7).

Compounds of the present invention are useful for the control and kill of various bacterial and fungal pests. For such use, the unmodified compound can be employed. Alternately, the compound can be dispersed on an inert solid and the resulting product can be employed as a dust. Also, such preparation can be dispersed in water with or without the aid of a wetting agent, and the resulting aqueous dispersions employed as sprays, drenches or washes. In other procedures, the compound can be employed in oil or other solvents or as a constituent solvent-in-water or water-in-solvent emulsions or as aqueous dispersions thereof which can be applied as a spray, drench or wash. In representative operations, the desired compound was added to a nutrient agar composition. The nutrient agar composition was then poured into a petri plate and after hardening was surface inoculated with the bacterial or fungal organism to be tested. The inoculated plates were incubated under optimal growth conditions for the organism being treated. As a result of such operations, 4,4,5,6 - tetrachlorotetracyclo[5,3,0,0$^{2,10}$,0$^{3,8}$]dec-5-ene gave complete control of the growth of *Staphylococcus aureus*, *Candida albicans*, *Salmonella typhosa*, *Mycobacterium phlei.*, *Trichophyton mentagrophytes*, *Bacillus subtilis*, *Pulluraria pullulans*, *Candida pelliculosa* and *Aspergillus terreus* when employed as the sole toxic constituent in the agar at a concentration of 500 parts per million by weight.

The tetrahalocyclopropene starting materials employed as starting materials in the present invention are known compounds and prepared in accordance with known procedures. (See U.S. Patent No. 3,335,194.)

What is claimed is:

1. A 4,4,5,6 - tetrahalotetracyclo[5,3,0,0$^{2,10}$,0$^{3,8}$]dec-5-ene selected from the group consisting of 4,4,5,6-tetrachlorotetracyclo[5,3,0,0$^{2,10}$,0$^{3,8}$]dec-5-ene and 4,4,5,6-tetrabromotetracyclo[5,3,0,0$^{2,10}$,0$^{3,8}$]dec-5-ene.

2. The new compound claimed in claim 1 wherein the 4,4,5,6-tetrahalotetracyclo[5,3,0,0$^{2,10}$,0$^{3,8}$]dec-5-ene is 4,4,5,6-tetrachlorotetracyclo[5,3,0,0$^{2,10}$,0$^{3,8}$]dec-5-ene.

3. The new compound claimed in claim 1 wherein the 4,4,5,6-tetrahalotetracyclo[5,3,0,0$^{2,10}$,0$^{3,8}$]dec-5-ene is 4,4,5,6-tetrabromotetracyclo[5,3,0,0$^{2,10}$,0$^{3,3}$]dec-5-one.

4. The process which comprises reacting together bicyclo[2,2,1]hepta-2,5-diene and a member of the group consisting of tetrachlorocyclopropene and tetrabromocyclopropene, said reaction being carried out at a temperature of from 50° to 120° C.

No references cited.

D. D. HORWITZ, Primary Examiner

U.S. Cl. X.R.

424—352